United States Patent

[11] 3,570,632

[72] Inventor William J. Williams
Ashtabula, Ohio
[21] Appl. No. 774,874
[22] Filed Nov. 12, 1968
[45] Patented Mar. 16, 1971
[73] Assignee Rockwell-Standard Company
Pittsburgh, Pa.

[54] BRAKE STRUCTURE
7 Claims, 8 Drawing Figs.

[52] U.S. Cl............................................. 188/79.5,
188/196
[51] Int. Cl......................................... F16d 65/46
[50] Field of Search............................................. 188/79.5
(GE), 50, 196 (M)

[56] References Cited
UNITED STATES PATENTS
2,303,699 12/1942 Main ........................... 188/79.5(SO)X
2,536,410 1/1951 Anderson..................... 188/79.5(SO)
3,227,247 1/1966 Sherretts et al.............. 188/79.5(GE)

Primary Examiner—Duane A. Reger
Attorney—Strauch, Nolan, Neale, Nies & Kurz

ABSTRACT: In a brake assembly a special locking retainer is disposed between an end of a brakeshoe web and the abutting outer end of a threaded stud rotatably carried by an actuator and comprising part of the brakeshoe adjustment mechanism. The stud is rotatably mounted on the actuator assembly and has a toothed peripheral portion at its outer end. The retainer is a one piece stamping of resilient sheet metal having a slotted end boss for seating on the stud and nonrotatably receiving the brakeshoe end and opposed radial arms reversely bent to form substantially U-shaped resilient clips extending around said toothed peripheral portion of the stud with each clip having an internal detent adapted to be interlocked with the toothed stud periphery. The retainer holds the stud against rotation during automatic brake adjustment, but permits stud rotation for manual brake adjustment.

PATENTED MAR 16 1971

INVENTOR
WILLIAM J. WILLIAMS

BY *Strauch, Nolan, Neale,*
*Nies & Kurz,*
ATTORNEYS

INVENTOR
WILLIAM J. WILLIAMS
BY Strauch, Nolan, Neale,
Nies & Kurz
ATTORNEYS

BRAKE STRUCTURE

BACKGROUND OF THE INVENTION

The invention relates to automotive vehicle brakes and particularly to brakes of the type wherein automatic adjustment is incorporated in the actuator unit.

U.S. Pat. No. 3,068,964 discloses for example such an automatic brake adjustment wherein a plunger assembly engaging a brakeshoe web end is automatically adjusted in length during normal brake actuation as the brakeshoe lining wears. In such an actuator, a stud structure engaging the brakeshoe web is rotatably threaded within a nutlike adjustment member and rotation of that member causes relative rotation thereto of the stud to displace the stud outwardly and thereby elongate the plunger assembly. It was earlier believed that friction between the threads of the stud and adjustment member and the bearing pressure of the shoe web on the stud would hold the stud against rotation about its axis when the adjustment member was rotated during automatic adjustment but, especially in larger actuators, it was found necessary to provide a means for holding the stud against undesired rotation during automatic adjustment. At the same time provision had to be made for the manual adjustment rotation of the stud when desired.

Such a holding means is disclosed in U.S. Pat. No. 3,227,247 wherein a sheet metal retainer or locking member is resiliently mounted on the star wheel shaped outer end of the stud and has slotted engagement with the adjacent brakeshoe web. The present invention is concerned with an improvement in this type of retainer and its action in the assembly, and such is the major object of the invention.

Another object of the invention is to provide a reliable novel one-piece retainer adapted to be mounted between a brakeshoe web and an actuator plunger assembly holding the web against lateral shift while permitting both automatic and manual adjustment.

A further object of the invention is to provide, in a brake assembly of the type wherein a stud of an actuator plunger engaging a brakeshoe web end is rotated during automatic brake adjustment, a novel one-piece retainer having slotted engagement with the brakeshoe web and a resilient clip and detent engagement with the teeth of a star wheel on the stud.

Another object of the invention is to provide a novel one-piece sheet metal retainer having oppositely extending arms formed with substantially U-shaped opposed clips at their ends and internal detents on the clips. Further specific objects of the invention such as a central boss on the retainer slotted in alignment with the detents and other structural features will appear as the description proceeds in connection with the appended claims and the accompanying drawings.

PREFERRED EMBODIMENTS

Figure 1:
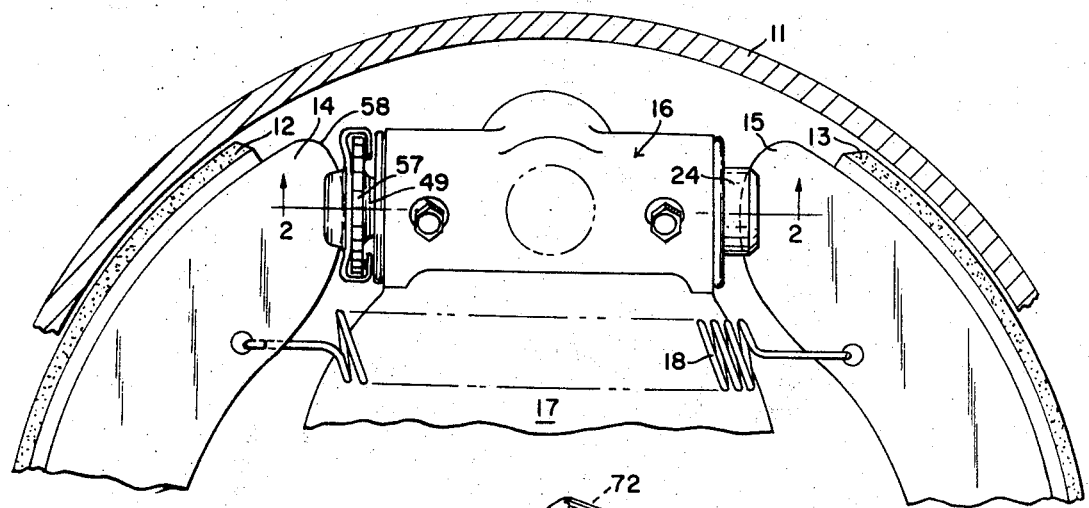
FIG. 1 is a fragmentary side elevation showing the upper part of a brake assembly incorporating a preferred embodiment of the invention.

FIG. 1 shows a brake assembly comprising a brake drum 11 mounted on a ground engaging wheel (not shown). The internal surface of drum 11 is adapted to be engaged by friction linings 12, 13 on brakeshoe 14, 15. Shoes 14 and 15, at least at one pair of adjacent ends as shown, have an actuator unit 16 disposed between them.

In a preferred form of brake assembly, an actuator of this type is disposed between each pair of opposite ends of two brakeshoes, such arrangement being disclosed in U.S. Pat. No. 3,037,584. The actuators are mounted suitably on a spider or like support 17 fixed on the vehicle axle beam or housing (not shown). The brakeshoes are movably connected to the spider, and they are interconnected by return springs 18 that urge their ends toward the actuators.

Figure 2:
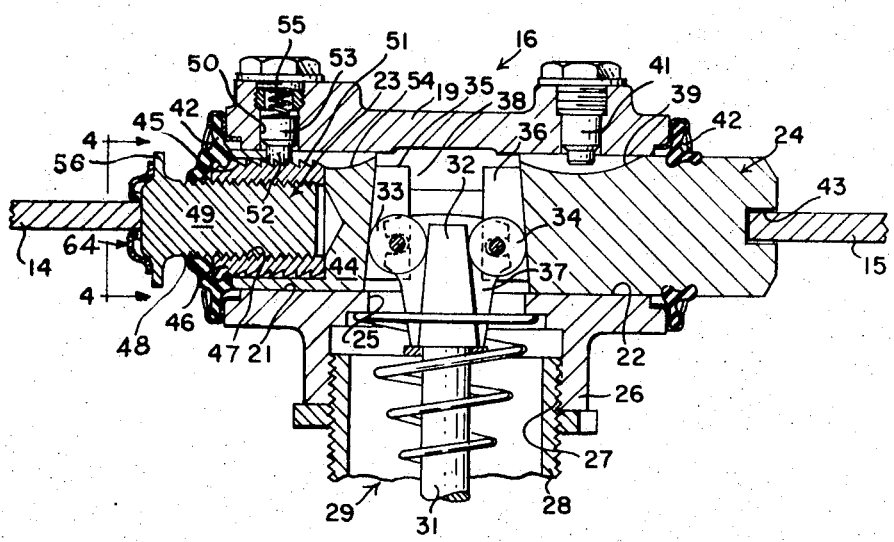
FIG. 2 is a section substantially on line 2–2 of FIG. 1.

FIG. 2 illustrates details of actuator which comprises a housing 19 rigid with spiders 17 and formed with opposed similar coaxial end bores 21 and 22 slidably mounting plunger assemblies 23 and 24 respectively. A side of housing 19 has an opening 25 from which extends a coaxial hollow boss 26 internally threaded at 27 to mount the tubular support 28 of a fluid pressure responsive device 29 having a reciprocable rod 31 carrying a wedge 32 disposed between rollers 33 and 34 that extend into the grooved inner ends 35 and 36 respectively of the plungers.

Rollers 33 and 34 are preferably mounted on the wedge rod by a carrier 37 and, when rod 31 is displaced toward the housing in FIG. 2, the plunger assemblies are equally outwardly displaced in their bores against the force of the return springs to frictionally engage the brakeshoes with the drum. When the brakes are disengaged, the return springs displace the plunger assemblies into the housing where they abut opposite ends of an internal limit stop projection 38.

Plunger assembly 24 is nonadjustable in length and has a side slot 39 coacting with a pin 41 on the housing to prevent its rotation in bore 22. A suitable flexible seal unit 42 is mounted between the housing at the outer end of bore 22 and plunger 24. The outer end of the plunger 24 is grooved at 43 to rockably slidably receive the end of the web of brakeshoe 15.

Plunger assembly 23 is adjustable in length for determining clearance between the brake linings and the drum in the disengaged condition of the brakes and comprises an outer member 44 slidable in bore 21 and having an internally cylindrical bore 45 axially slidably mounting an inner member 46. Member 46 is formed with an internally threaded bore 47 in which is rotatably mounted the threaded shank 48 of a brake shoe engaging stud 49. The outer periphery of member 46 is formed with spiral ratchet teeth 51 engaged by ratchet teeth 52 on the inner end of a pin 53 that is slidably retained in housing bore 50 and projects through a side slot 54 in member 44. Pin 53 is biased inwardly by a spring 55 to provide ratchet action, and it coacts with slot 54 to prevent rotation of the outer plunger member 44 in bore 21.

During normal operation, as the plunger assembly 23 is displaced outwardly in brake applying direction by wedge 32, member 46 will move outwardly relative to pin 53. If the outward displacement of member 46 is greater than the pitch of ratchet teeth 51, then on the return stroke when the brake is disengaged the ratchet action of teeth 51 and 52 results in rotation of member 46 in bore 47 and consequent relative rotation between member 46 and threaded stud 49 to produce outward displacement of stud 49 relative to member 46 and therefore automatic length adjustment of the plunger assembly. Stud 49 does not rotate because of its connection with the brake web as will appear.

The foregoing automatic adjustment of the plunger assembly 23 is preferably the same as disclosed in U.S. Pat. No. 3,068,964 to which reference is made for further detail. The wedge actuation of the plunger is preferably the same as that disclosed in said Pat. No. 3,037,584. A flexible seal 42 is also provided between plunger assembly 23 and the housing at the outer end of bore 21, and these seals 42 are preferably that disclosed in U.S. Pat. No. 3,385,118 issued May 28, 1968.

Figure 4:
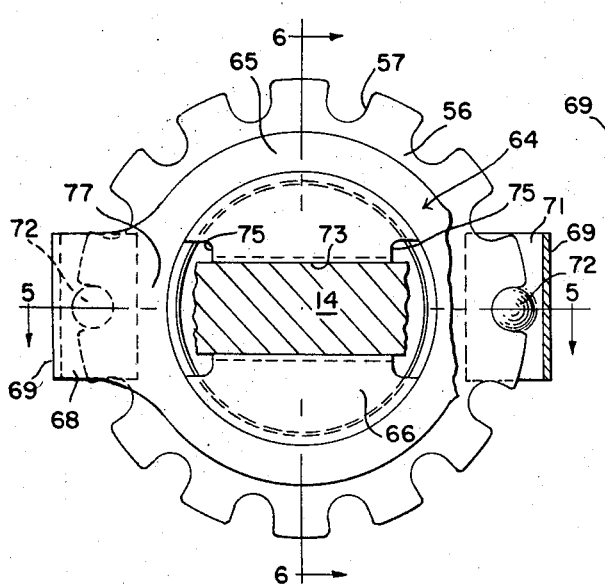
FIG. 4 is an end view partly broken away and in section substantially on line 4–4 of FIG. 2 showing the retainer of FIG. 3 in the assembly.

The outer end of stud 49 comprises an enlarged flange 56 having a toothed periphery 57 to provide a star wheel as shown best in FIG. 4. The adjacent arcuate end face 58 of the brakeshoe web (FIG. 6) bars rockably and slidably on the flat end fact 59 of an outer end boss 61 of stud 49. Boss 61, as shown best in FIG. 7 is surrounded by a cylindrical surface 62 that at its inner end intersects a flat outer face 63 on flange 56 that is perpendicular to the axis of stud 49 and parallel to face 59.

Figure 3:
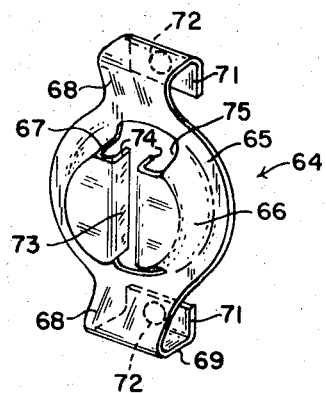
FIG. 3 is a generally perspective view of a brakeshoe retainer according to a preferred embodiment of the invention.

A brakeshoe retainer or locking member 64 is mounted on stud 49. Retainer 64 is shown in FIG. 3 apart from the assembly and it is an integral sheet metal element, preferably of stainless steel having a thickness of about one thirty-second inch. It may be formed by stamping.

Retainer 64 has an annular base portion 65 surrounding an outwardly projecting hollow boss 66 having a generally cylindrical sidewall or skirt 67. Two identical diametrically opposite spring locking arms 68 project from base 65. As shown in FIG. 7, each arm 68 extends at an acute angle to the plane of base 65 and is bent to provide an inwardly open substantially U-shaped clip having a bridge portion 69 and an inwardly extending flange portion 71 that is preferably substantially parallel to base 65. In the assembly (FIG. 7) arms 68 extend at an acute angle to flange face 63. Each flange 71 is formed with a rounded detent 72 projecting internally toward arm 68.

Figure 6:
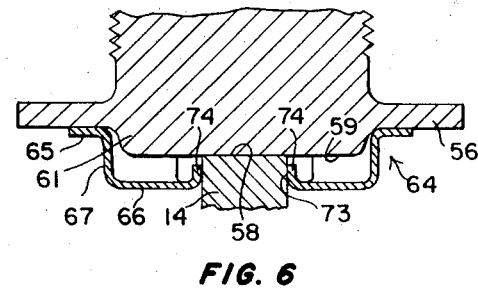
FIG. 6 is a section substantially in line 6–6 of FIG. 4 further showing retainer structure.
Figure 7:
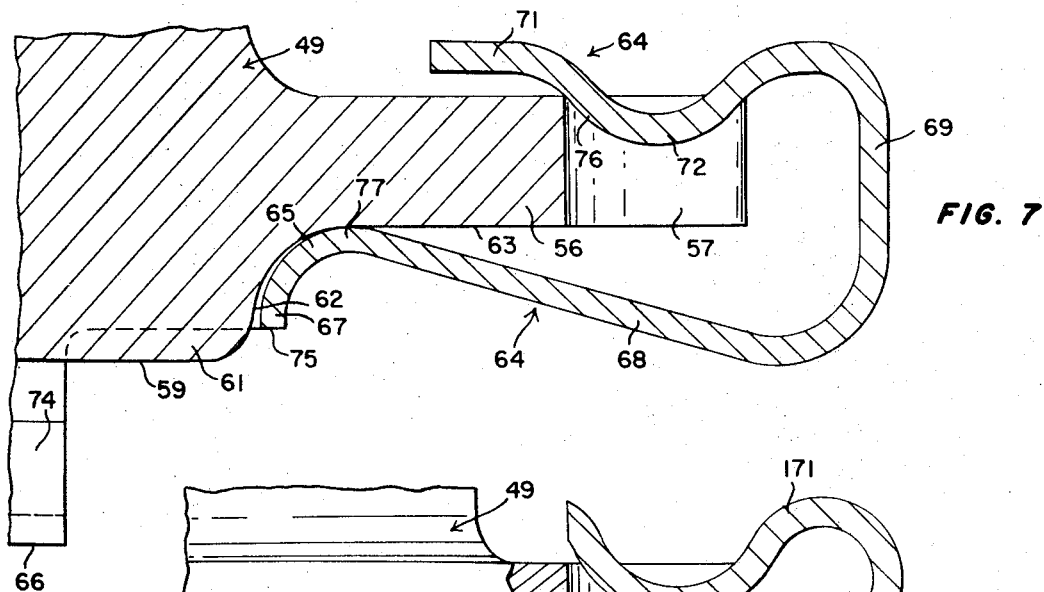
FIG. 7 is an enlarged fragmentary section showing coaction of the retainer and adjustment wheel.

Boss 66 is formed with a straight sided diametral slot 73 (FIG. 4) preferably made by slitting the boss and bending the opposite edges to form parallel internally projecting lips 74 which, as will appear and as shown in FIG. 6, are spaced to slidably receive the straight sided web of brakeshoe 14. Slot 73 is preferably diametrically aligned with both detents 72.

As illustrated slot 73 is preferably considerably widened at opposite ends at 75 by cutting away material of the skirt. This provides for efficient assembly and engagement of retainer 64 with the brakeshoe web 14.

In the assembly, retainer 64 is snapped onto the outer end of stud 49 with boss 66 fitting over stud end boss 61 so that the retainer is held against lateral movement with respect to the stud and with the opposed U-shaped clips on arms 68 flexibly embracing the periphery of the star wheel.

Figure 5:
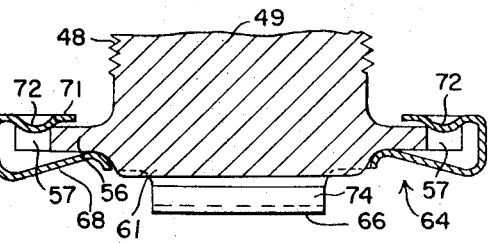
FIG. 5 is a section substantially on line 5–5 of FIG. 4 showing the retainer holding detents.

As shown in FIG. 7, base 65 seats on stud surface 63 and each detent 72 fits into the space between two adjacent star wheel teeth 57. The inner surfaces of arm 71 engage the teeth at opposite sides. During assembly the inner curved surface 76 between the detent and flange 71 serves to cam the flange outwardly to open up the U-clip sufficiently to enable detent 72 to enter the space between teeth 57, and the inherent resilience of the clip results in the parts assuming the locked position shown in FIGS. 5 and 7 wherein retainer 64 is normally resiliently locked against rotation with respect to stud 49 and nonrotatably embraces the adjacent brakeshoe web at slot 73.

The invention thereby provides an improved one-piece retainer of sufficient holding power to prevent relative rotation between the stud 49 and the brakeshoe web during normal brake actuation, but which is effective to permit relative rotation between the retainer and the star wheel to reposition detents 72 between a fresh set of adjacent teeth 57 during the automatic brake adjustment effective at 51, 52 of plunger assembly 23. Yet manual adjustment of the length of plunger assembly 23 may be effected by inserting a tool directly into teeth 57 to rotate stud 49, detents 72 being cammed out of the tooth spaces as the star wheel is rotated. In these respects the retainer of the invention has proved superior to that disclosed in Pat. No. 3,227,247.

The opposed resilient clips on retainer 64 effectively resiliently hinge about the regions 77 where they join the base 65 and where there is a maximum radial extent of metal for providing a greater spring action urging the detent 72 into the space between teeth 57 and holding it there.

Figure 8:
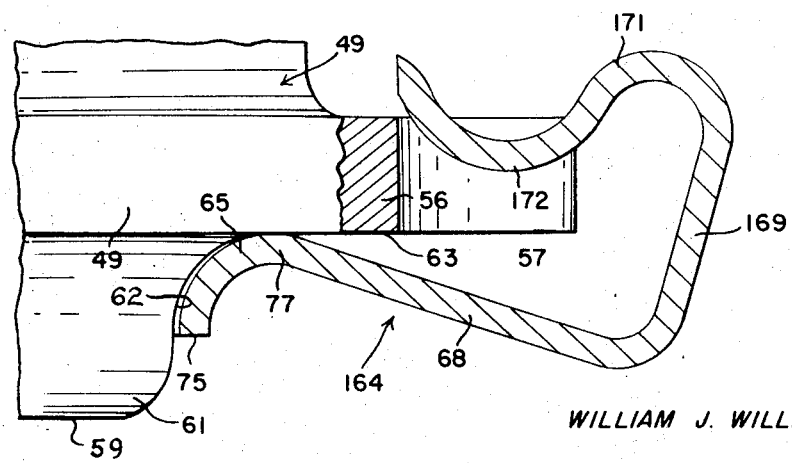
FIG. 8 is an enlarged fragmentary section similar to FIG. 7 showing another embodiment of retainer.

Another embodiment of the invention is shown in FIG. 8 wherein the retainer 164 is substantially the same as retainer 64 but has a somewhat different clip construction in that bridge 169, instead of being substantially perpendicular to the plane of stud face 63 as is bridge 69 in FIG. 7, is inclined outwardly at a small angle away from the star wheel before being reversely bent to form arm 171 carrying detent 172. This embodiment may be used on smaller brake assemblies wherein the retainer may be made of thinner gauge metal.

I claim:

1. For use in a brake assembly of the type wherein an end of a brakeshoe is disposed in frictional abutment with the end surface of a projection on the outer end of an adjustable actuator member that comprises part of brake shoe adjustment mechanism and is rotatably mounted on the actuator and has a toothed peripheral portion at said outer end, a one-piece sheet metal retainer having a boss adapted to fit upon said projection and slotted for nonrotatably receiving the brake shoe end and opposed arms reversely bent at their outer ends to form substantially U-shaped resilient clips for extending around said toothed peripheral portion of the actuator member and each clip comprising an inwardly projecting terminal flange having an internal detent adapted to be interlocked with said toothed periphery, whereby said retainer in the assembly is held against lateral displacement by said projection and prevents rotation of said actuator member during automatic adjustment while permitting rotation for manual adjustment.

2. In a brake assembly comprising a pair of brakeshoes adapted to engage a surrounding brake drum, a housing having aligned openings, plungers slidingly guided in said openings and adapted, when urged apart, to urge said shoes toward said drum, at least one of said plungers having a threaded bore, a stud threaded into said bore, a star wheel rigid with said stud adjacent the outer end thereof, said stud having a reduced extension projecting beyond said star wheel, said extension having a flat outer end surface directly engageable by one of said brakeshoes whereby said stud may rotate with respect to said one brakeshoe, and a locking member having a recess fitting around said extension to prevent lateral shifting movement of said locking member with respect to said stud while permitting relative rotation therebetween, said locking member having a diametral slot receiving the end of said one brakeshoe whereby the end of said one brakeshoe holds said locking member against rotation and said locking member holds said brakeshoes against said lateral shifting movement, the improvement wherein said locking member is formed of resilient sheet metal, wherein said locking member has at least one radially outward extension extending radially outwardly beyond the periphery of the star wheel in spaced relation to said star wheel, axially over and in spaced relation to the periphery of the star wheel and then radially inwardly toward the axis of said stud, the radially inwardly extending portion of said locking member having an integral detent thereon normally projecting inwardly axially between the adjacent pair of teeth on said star wheel to prevent inadvertent relative rotation between said locking member and star wheel, the resilience of said locking member permitting forced disengagement of the detent from between such adjacent teeth to thereby permit relative rotation between said stud and locking member.

3. A one-piece spring metal retainer adapted to be interposed between a brakeshoe end and an adjustment member comprising a generally annular body having an axially projecting diametrally slotted hollow boss and two angularly spaced generally radial arms formed at their outer ends to provide opposed inwardly open substantially U-shaped clips with the outer leg of each clip being formed with an internal detent projecting toward the other leg, said boss and body being cut away at opposite ends of said slot to provide wide end portions for the slot.

4. The retainer defined in claim 3, wherein substantially parallel lips at opposite sides of the boss slot extend inwardly toward said body.

5. The retainer defined in claim 4, wherein said detents are rounded projections aligned with said slot.

6. For use in brake assembly of the type wherein an end of a brakeshoe is disposed in frictional abutment with a surface on the outer end of an adjustable actuator member that comprises part of brakeshoe adjustment mechanism and is rotatably mounted on the actuator and has a toothed peripheral portion at said outer end, a one-piece sheet metal retainer having a slotted central portion for nonrotatably receiving the brakeshoe end, parallel lips on the opposite sides of the slot slidably receiving the brakeshoe end, and opposed arms extending from said central portion and reversely bent at their outer ends to form substantially U-shaped resilient clips for extending around said toothed peripheral portion of the actuator member and each clip comprising an inwardly projecting terminal flange having an internal rounded detent adapted to be laterally interlocked with said toothed periphery.

7. The invention defined in claim 1 wherein said boss is surrounded at its base by an annular portion of said retainer adapted to seat on the end of said adjustment member, and each said arm extends at an acute angle from said annular base portion at the side of said boss.